US007529773B2

(12) United States Patent
Rogers

(10) Patent No.: US 7,529,773 B2
(45) Date of Patent: May 5, 2009

(54) IDEA SERVICE FOR AUTOMATIC FILE NAMING AND STORING

(75) Inventor: Mark F. Rogers, Fort Collins, CO (US)

(73) Assignee: Parametric Technology Corporation, Needham, MA (US)

( * ) Notice: Subject to any disclaimer, the term of this patent is extended or adjusted under 35 U.S.C. 154(b) by 661 days.

(21) Appl. No.: 10/499,134

(22) PCT Filed: Dec. 19, 2002

(86) PCT No.: PCT/EP02/14542

§ 371 (c)(1),
(2), (4) Date: Dec. 1, 2004

(87) PCT Pub. No.: WO03/052629

PCT Pub. Date: Jun. 26, 2003

(65) Prior Publication Data

US 2005/0086268 A1   Apr. 21, 2005

(51) Int. Cl.
*G06F 17/30* (2006.01)
(52) U.S. Cl. .......................... 707/200; 707/204; 707/1
(58) Field of Classification Search ................. 707/200, 707/1, 204
See application file for complete search history.

(56) References Cited

U.S. PATENT DOCUMENTS 5,799,319 A * 8/1998 Atkins ....................... 707/200

6,669,483 B1 * 12/2003 Leight et al. ................ 434/262
6,684,188 B1 * 1/2004 Mitchell et al. ................ 705/3
6,885,481 B1 * 4/2005 Dawe ........................ 358/505
2002/0078069 A1 * 6/2002 Moore ........................ 707/200

OTHER PUBLICATIONS

Fischer, S., "Course and Exercise Sequencing Using Metadata in Adaptive Hypermedia Learning Systems", ACM Journal of Education Resources in Computing, vol. 1, No. 1, 2001.
"EJB MetaData Store", IBM, Jun. 2001.
Pollack, J. et al., "Syntactic and Semantic Validation within a Metadata Management System", http://gcmd.gsfc.nasa.gov/Aboutus/presentations/conferences/eogeo01/eogeo_01.html, Jun. 2001.
European Patent Search, Apr. 9, 2008.

* cited by examiner

*Primary Examiner*—Tim T. Vo
*Assistant Examiner*—Mahesh H Dwivedi
(74) *Attorney, Agent, or Firm*—Lahive & Cockfield, LLP

(57) ABSTRACT

Disclosed is method and system that automatically names and stores electronic files by associating metadata with the files. The metadata may be stored in the header of each file, and the metadata automatically designates file names and locations to each file. A user interface allows a user to input and edit files. A Java Virtual Machine is started up upon boot-up and runs a Java main thread, which creates the user interface. A Java database-access thread, spawned from the Java main thread, queries storage devices as to availability to receive files. A message is returned to the user confirming the status of the attempted file save function.

39 Claims, 11 Drawing Sheets

```
Class Main, Thread extends Runnable {
    FileSender fileSender;
    NoteWriter noteWriter;
    Private init() {
        If (not get DB info ()) throw exception;     ←—902
    } public run () {                                   ←—904
        while (not done) {                            ←—906
            if (fileSender.filesWaiting()) {          ←—908
                fileSender.start();                   ←—910
            } else if (create NewNote()) {            ←—912
                noteWriter getNote();                 ←—914
            }
        }
    }
}
.
.
.
.
.
}
                    status=mydb.sendfile(filename);   ←—916
                                                      ↖900 PSUEDO
                                                              CODE
```

FIGURE 9

IDEA SERVICE FOR AUTOMATIC FILE NAMING AND STORING

BACKGROUND OF THE INVENTION a. Field of the Invention

The present invention pertains generally to electronic files and more particularly to automated methods of naming and storing electronic files.

b. Description of the Background

Currently, on a personal computer, laptop, palm pilot, electronic pocket organizer, or other computing device, saving an electronic file requires a user to designate a name for the file to be saved and specify a location of where that file is to be saved. A "file" herein is defined as a collection of data or information that has a name, called the filename. Almost all information stored in a computer must be in a file. There are many types of files: data files, text files, program files which may include code, directory files, files of graphical format including Graphical Interchange Format (GIF) and Joint Photographic Experts Group (JPG), and other types of files. Different types of files store different types of information. For example, program files store program executable code, text files store text, and so on. Such files may be created and/or named locally on a user's personal computer (PC) or on a network. The "user" is herein defined as the person who creates, edits, and views an electronic file. Files may be transmitted to a storage device via a wireless link, such as a satellite link, a radio frequency link or other link. Of course, files may be transmitted via a hardwire link, or other type of physical link.

Currently, when a user wishes to save a file, the user must perform two tasks: designate a filename for the file, and specify the location of where that file is to be saved. The user may be required to bring up a user interface, choose a location (i.e., a directory) in which the file is to be stored, designate an appropriate file name, press save, or perform other tasks. This method of saving files is cumbersome and time-consuming, especially for users who wish to save a file simply and quickly. For example, inventors whose primary objective is to spontaneously create ideas, invent solutions, and record brainstormed ideas, may not want to spend unnecessary time or effort in specifying a filename and location. During the time needed to specify filename and location, an idea may be lost. Inventors would benefit from an instantaneous, automatic method of naming and storing files.

Further, in current computing devices such as PC's, the moment the "save" option is selected by the user, a file-saving program is started up by the computer operating system. The current method of naming/storing files is inefficient because it takes time to wait for programs such as Word, Notepad, etc. to start up.

A need therefore exists for a simpler, less time-consuming, and more efficient way for a user to store and name files.

SUMMARY OF THE INVENTION

The present invention overcomes the disadvantages and limitations of the prior art by providing a method and system in which a user may submit a file or idea completely automatically without designating a file name or location for the file to be saved. The file location is a sub-structure within a database. Metadata associated with the file is used to automatically assign an appropriate file name and location to the file. Metadata is data describing data and the user. Metadata may be input by the system administrator, by a supervisor, by the user themselves, or by automated methods. Metadata may describe how, when and by whom a particular set of data (or a file) was collected, and how the data is formatted. Metadata is essential for understanding information stored in data warehouses, which combine many different databases across an entire enterprise.

A benefit of using metadata (over key words) to store and name files is that metadata helps store the file more efficiently. Users (creators of files) have more control over the name and location of the file, as metadata may be input manually by the user. Furthermore, metadata makes the grouping of similar types of files more efficient.

The present invention also overcomes the disadvantages and limitations of the prior art by utilizing a Java Virtual Machine (JVM) to carry out the task of naming and storing files. A JVM is started upon boot-up of a computer and is literally a "virtual" personal computer running within the physical memory of a computer. The JVM sleeps in the background of the operating system (remains inactive) until summoned by the user. The JVM does not employ any more resources of the computer than those resources utilized by conventional programs used for saving files. A benefit of starting the Java Virtual Machine (JVM) upon boot-up, as opposed to upon user request, is that the time required to launch a user interface (UI) is reduced. Furthermore, fewer steps are taken in order to accomplish the task of saving a file. The present invention therefore expedites and simplifies the process of saving files by bypassing the usual file storage user interfaces (which require a user to select a folder/directory and a file name) and instead storing the file (with its associated metadata) in a database.

The present invention further comprises a "main thread" that runs within the JVM. Herein, "thread" is defined as a piece of program, within a parent program, that runs independently of the parent program. The visible portion of the main thread is a user interface, which may be in the form of a graphical user interface. Herein, the user interface is also referred to as the "Idea service." The main thread is further discussed with regard to the descriptions of FIGS. 2*b*, 7, 8, and 9.

Java programs are very resource-intensive for a computer to start up. By implementing the present invention as a service or thread that is already running when the thread is called upon by a user, user interfaces appear very quickly.

The present invention may therefore comprise a method of automatically naming and storing a file that has been created by a user comprising: creating the file within a user interface by creating and editing information within the user interface, creating metadata to accompany the file, inserting the metadata into the file, using the metadata to automatically name the file, and using the metadata to automatically store the file in an automatically determined location.

The present invention may further comprise a system of automatically naming and storing a file that has been created by a user comprising: a user interface in which the file is created and edited, a program that parses metadata (located in the header of the file) and that automatically designates a filename and location to the file, a virtual machine that is started upon boot-up, and acts as a virtual computer within a physical computer, a main thread, that runs within the virtual machine, and that creates the user interface and makes the user interface visible to the user, a database-access thread that is spawned from the main thread, and a storage device, coupled to the database-access thread that is queried by the database-access thread as to status of availability for storage of the file and that receives the file from the database-access thread, stores the file once the storage device becomes available, and sends a message back to the database-access thread confirming status of attempted file save function.

An advantage of the present invention is that automated methods of naming and storing files are more time-efficient than current methods. Time efficiency is important for inventors who brainstorm. Supervisors of a group of inventors may be able to view files (ideas) based on inventor names within the inventor group or by project name or description, based on metadata.

Another advantage of the present invention is that the present invention may also be implemented by wireless methods, such as by submitting ideas via a cell phone, laptop, palmtop with a cellular link, etc. Files may be transmitted, named, and stored by sending the files from a remote location, such as a cell phone, to a central computer via a wireless link, such as a satellite link, a radio frequency link or other link as will subsequently be explained with regard to the description of FIG. 10. Wireless methods allow the user complete freedom of location and provide instant transmission of files. The benefit of both a regular and a wireless application of the present invention is that files can be submitted immediately by a user. The files will then be stored and named by the present invention, freeing the user of the obligation of selecting a file name and location, and allowing the idea to be submitted safely and immediately.

Another advantage of the present invention is that the present invention may be carried out by any computer language. Such computer languages may include C, C++, or any other language. The benefit of using Java for carrying out the present invention is that Java is platform independent. That is, Java-specific programs may be run on UNIX operating systems, Widows operating systems, or any other operating system. Furthermore, in Java, threads are used to carry out certain functions. A thread is simply a program designed to carry out certain functions. The difference between a program in other computer languages and a thread in Java is that a Java thread takes less time to invoke once the JVM is running. By starting the JVM as a daemon when the system is booted up, a user interface (UI) may be invoked much more quickly later on; A thread is a more efficient way of accomplishing some tasks.

BRIEF DESCRIPTION OF THE DRAWINGS

In the drawings,

FIG. 9 is an example of pseudo-code used for the implementation of the main thread.

DETAILED DESCRIPTION OF THE INVENTION

Figure 1:
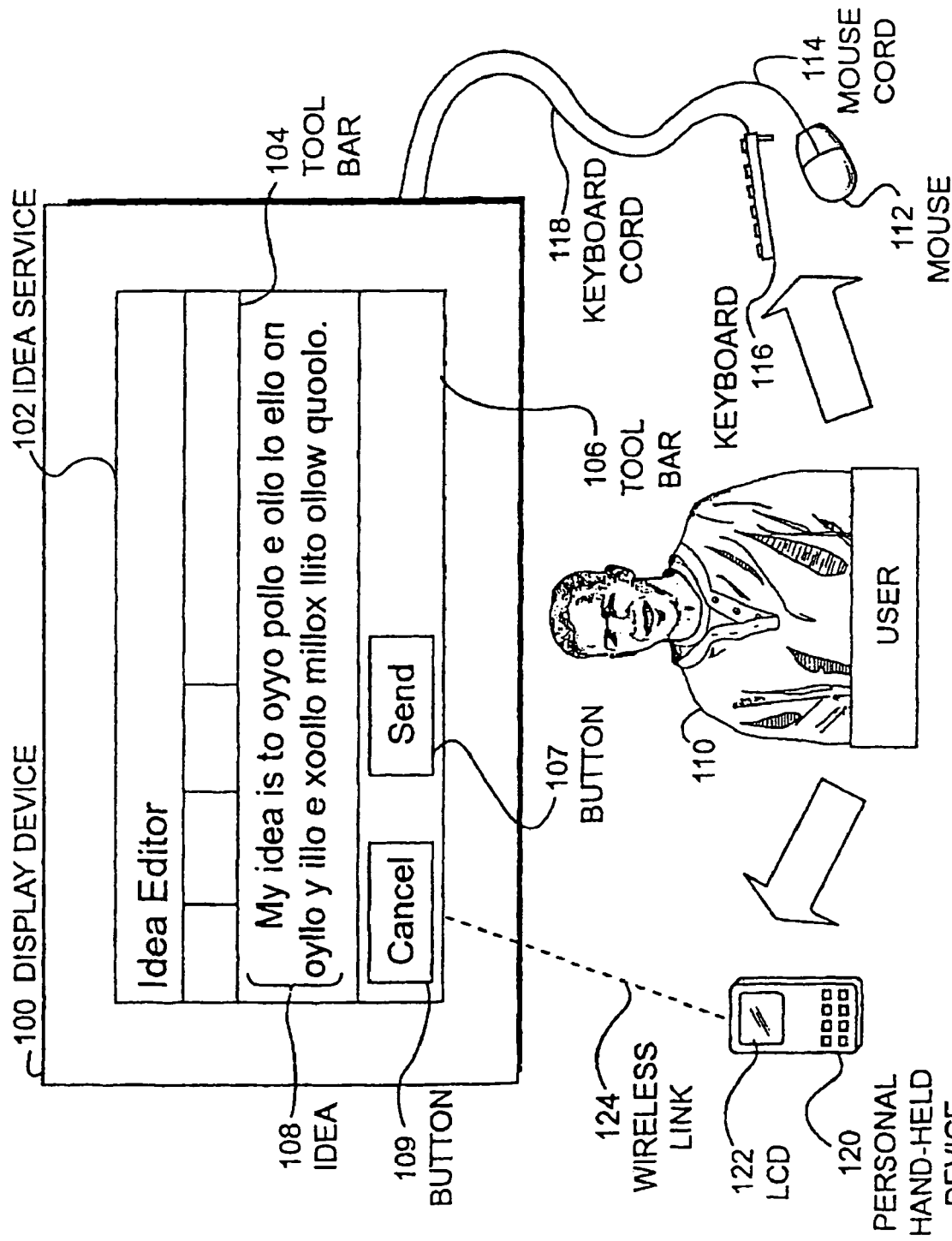
FIG. 1 is an illustration of one embodiment of the present invention.

FIG. 1 is an illustration of one embodiment of the present invention. Referring to FIG. 1, a graphical user interface, called an idea service 102 is displayed. Idea service 102 is a program that allows users to input ideas graphically, textually, or by other methods. That is, graphic images, graphic files, text information, or electronic information of any format may be input into the idea service 102 through functions such as "cut-and-paste," direct input/creation of graphics, text, or other information within the idea service 102 itself, or by other methods. Idea service 102 may include CAD/CAM functionality in order for a user to create graphical images or drawings within the idea service 102 itself. Idea service 102 may also allow the user to edit the user's idea.

Idea service 102 may be displayed on a display device 100, such as a computer monitor, which may comprise any type of display such as a plasma display, flat panel display, CRT monitor, television set, or any other display. Idea service 102 may be displayed in the form of a graphical user interface 102. Other ways of representing the idea service 102 may include using a text box, some other kind of graphical user interface, or any method of displaying the idea service 102.

Referring again to FIG. 1, the graphical user interface 102 may include a tool bar 104, another tool bar 106, recorded idea 108 which is to be stored, or any other item or graphical representation. As stated previously, the recorded idea 108 may comprise graphics, text, or other information, and may be input into the idea service 102 from another program or may be created within idea service 102. Once a user is satisfied with the recordation of idea 108, the user may elect to cancel or store/name the recorded idea 108 (file). The idea 108 may be stored and named by the user clicking on the "send" button 107, as shown in tool bar 106. The idea 108 may be stored/named automatically, without user command, in pre-designated time intervals, as is frequently done by functions such as "Auto-save" that are included in programs such as "Word". Should the user wish to abandon idea 108, the user may click on the "cancel" button 109 as shown in tool bar 106.

Referring again to FIG. 1, the user 110 interacts with the idea service 102. The "user", as previously discussed, is the person entering, editing, and viewing the idea 108 (file). The user may access and/or control the idea service 102 through use of a mouse 112 connected to the display device 100 via a mouse cord 114, keyboard 116 connected to the display device via a keyboard cord 118, or by any other method. The user 110 may also access and utilize the idea service 102 by wireless methods. These wireless methods may comprise accessing the idea service 102 by using a personal hand-held device 120, such as a personal computer (PC), a pocket organizer, day-timer, cellular telephone, cellular email device, or other device via a wireless link 124. The wireless link may comprise a radio frequency link, a satellite link, infrared (IR) link, or other type of link. The personal hand-held device may comprise a liquid-crystal display (LCD) 122.

Figure 2A:
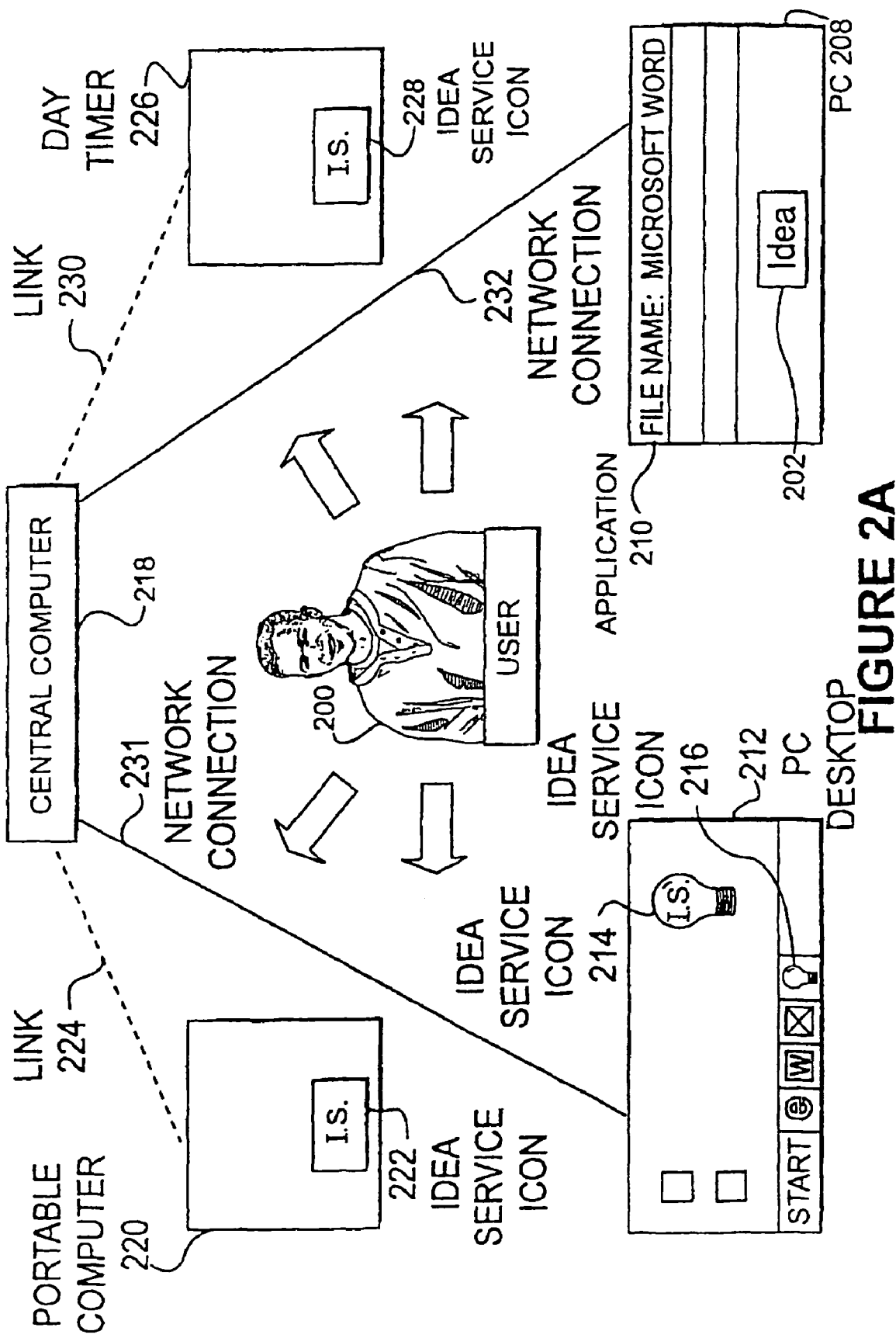
FIG. 2a is a graphical representation illustrating one implementation of the present invention.

FIG. 2a is a graphical representation illustrating one implementation of the present invention. As shown in FIG. 2a, there may be several devices from which an idea may be submitted. Such devices may be in a location remote to the location where the file is ultimately stored. Such devices may include a personal networked computer (PC) 208, a personal computer (PC) 212, a laptop 220, an electronic day-timer 226, or any device capable of transmitting electronic information. Such a central location may include a central computer 218, or any device capable of storing electronic information. An idea service 102 may be activated by a user 200 who wishes to store/name an idea 202. The idea 202 may be represented in any format, including text, graphics, or other representation. The user 200 may submit an idea 202 from any location. The user's idea 202 may exist on any device capable of transmitting information. Such devices may include a personal computer 208, connected to the central computer 218 via a network connection 232, with an application 210 running, such as Word, Excel, Netscape, or other application. Such devices may also include a personal computer (PC) desktop 212, which also may be connected to central computer 218, via a network connection 231, in which the idea service icon 214, shown as a light bulb, may be used to activate the idea service 102 by double clicking on the idea service icon 214. Conversely, the idea service 102 may be activated by clicking on another idea service icon 216 located on a tool bar. Activation of the idea service 102 may also be achieved by dialing up to the central computer 218 from a remote location. Such a remote location may comprise a desktop or portable computer 220. The portable computer 220 may comprise a liquid-crystal display (LCD), and an idea service icon 222 which activates the idea service 102. The laptop computer 220 may be connected to the central computer 218 via a link 224. The link 224 may comprise a radio frequency link, a satellite link, IR link, or other link. Conversely, such a remote location may comprise a day-timer 226, which may comprise a LCD, and an idea service icon 228 which activates the idea service 102. The day-timer 226 may be linked to the central computer 218 via a link 230. As before, the link 230 may comprise any type of link. Of course, the present invention may be implemented by any mechanism capable of transmitting data, which may include direct-connection devices, remote devices, or any other device.

Figure 2B:
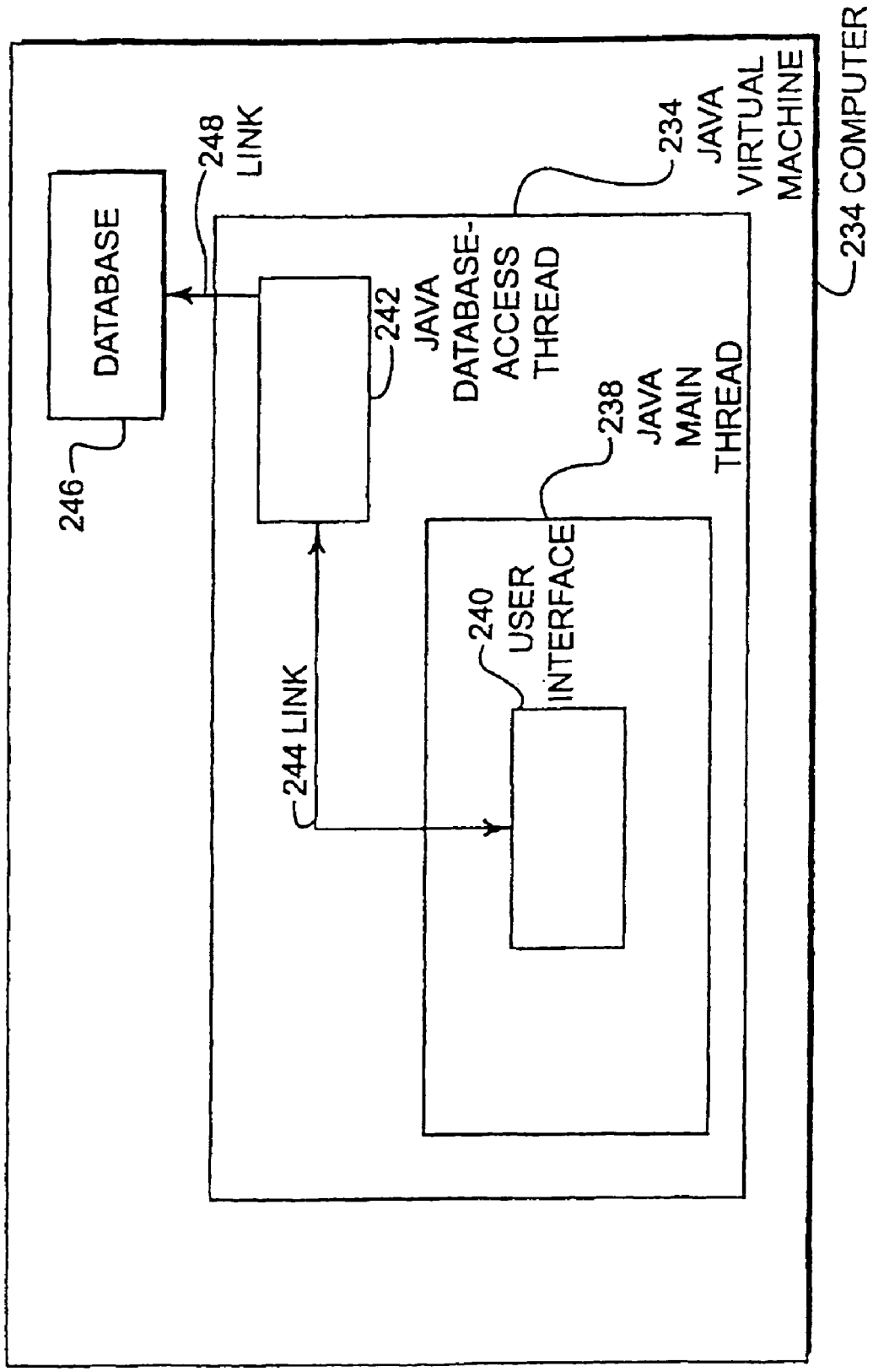
FIG. 2b is a graphical representation of another embodiment of the present invention.

FIG. 2b is a graphical representation of one embodiment of the present invention. As shown in FIG. 2b, a computer 234 starts up a Java Virtual Machine (JVM) 236 upon boot-up. As previously discussed, the JVM 236 operates as though the JVM were another computer within the physical computer 234. Running within the JVM 236 is a Java main thread 238. The Java main thread creates a user interface 240 and makes the user interface visible to the user. That is, the visible portion of the main thread, which is essentially a program within a program, is the user interface 240. The user interface 240 may be in the form of a text box, a graphical user interface, an interactive window, or any such mechanism that provides user input. The user interface is where the file is created and edited. The file may also be created by importing (cutting and pasting) images, text, etc. from other programs into the user interface. As before, this user interface 240 is also referred to as the idea service 102.

Referring again to FIG. 2b, the file that has been created in the user interface 240 has metadata associated with the file. As previously discussed, metadata is data describing the user and/or the file. Metadata may be input by the system administrator, by a supervisor, by the user themselves, or by automated methods. Metadata describes how and when and by whom a particular set of data (or a file) was collected, and how the data is formatted. Such metadata may be generated automatically, or the metadata may be generated manually by a system administrator or by the user. By using metadata, the file is automatically designated a file name and location as to where the file will be stored, as is discussed in more detail with regard to the descriptions of FIGS. 7, 8, and 9.

As FIG. 2b also illustrates, the JVM 236 also contains a Java database-access thread 242. The Java database-access thread 242 is spawned by the main thread. The Java database-access thread 242 is a program which receives a file (idea) from the user interface 240 (idea service 102) via a link 244. Once a file is received by the database-access thread, the Java database-access thread 242 attempts to connect to a database 246. When a database becomes available, the file is sent from the Java database-access thread 242 to the database 246 via a link 248. Such a storage device may comprise a database, central computer, or other storage device. The storage device may be located on the computer 234, or the storage device may be located on another computer such as a server, accessible by a network connection or by a wireless connection. Further, the computer 234 may comprise a wireless device, such as a cell phone or pocket organizer. Wireless applications of the present invention are discussed in further detail with regard to the description of FIG. 11.

As further shown in FIG. 2b, once the availability of the storage device has been queried by the Java database-access thread 242, the Java database-access thread may send a message back through link 244 to the user interface 240 stating whether or not the file was stored and named successfully. Such message may be a confirmation of success, including the file's automatically designated name and location, or an error message. Conversely, when the user clicks "send," the user interface may disappear.

Figure 3:
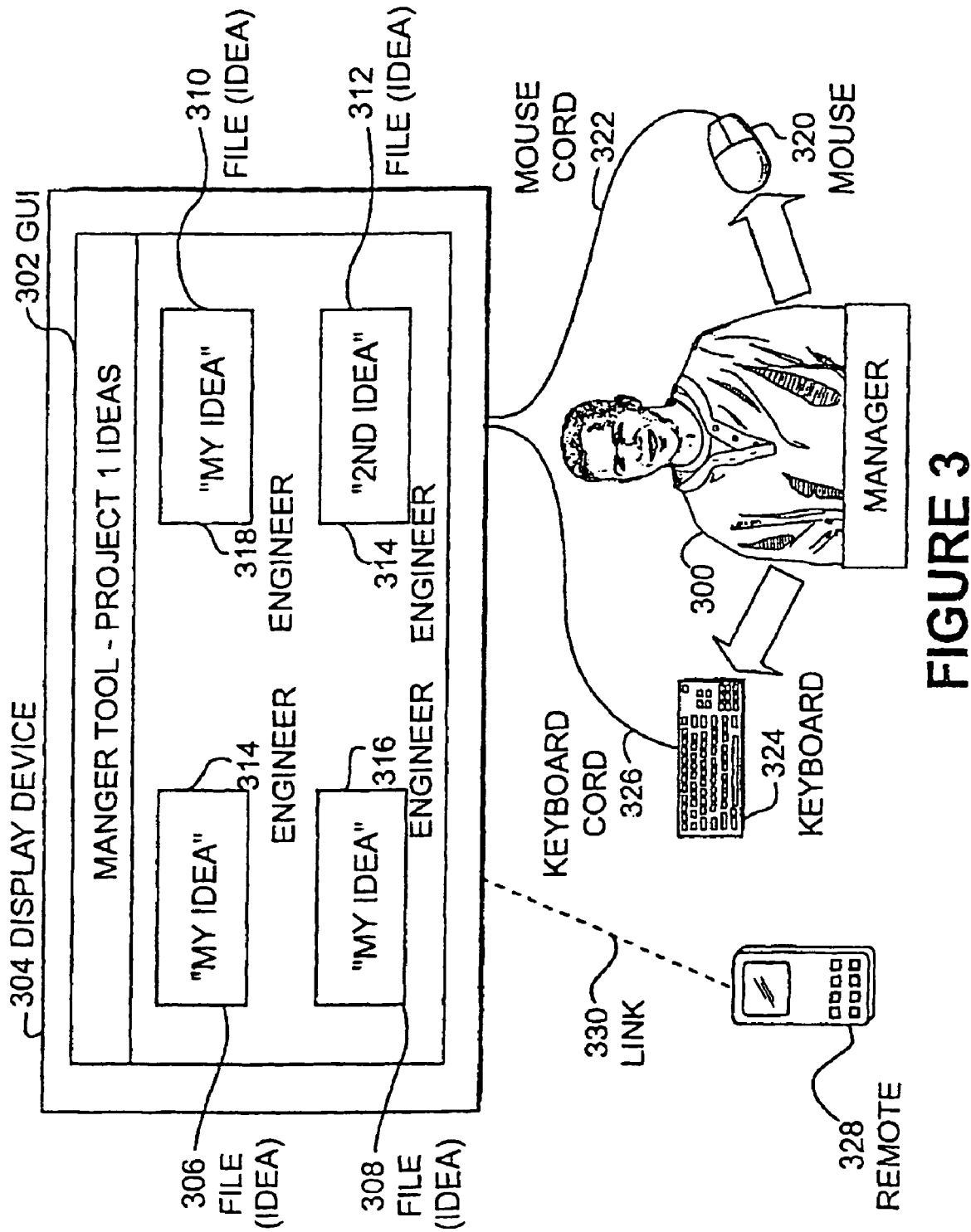
FIG. 3 is an illustration of another embodiment of the present invention.

FIG. 3 is an illustration of one embodiment of the present invention. The idea service 102 may make files (ideas) readily available to a manager 300, or person with the authority to view files submitted by the idea service 102. The manager may be a "project manager," or a person who is managing several people regarding particular projects. For example, the manager 300 may be able to view all files, or ideas, pertaining to a particular project, in this case "Project I," at one time. The idea service 102 may present a graphical user interface (GUI) 302, a text box, or any form of a display mechanism to the manager, which may be displayed on a display device 304 such as a computer monitor. The GUI may show files (ideas), 306, 308, 310, and 312 submitted by different users. In this embodiment, users may constitute engineers. Each engineer 314, 316, and 318 may submit more than one file. For example, engineer 314 has submitted two files or ideas 306 and 312, entitled "My idea" and "Second idea" respectively. Of course, the way in which files may be viewed may vary. For example, the manager 300 may wish to view all files regarding one particular project, or the manager 300 may want to view all files submitted from one particular submitter. As before, the manager 300 may view and/or control the files residing in the idea service 102 by use of a mouse 320 and mouse cord 322, keyboard 324 and keyboard cord 326, or other control device. Conversely, the manager 300 may view these files remotely, such as by a remote computer (portable or stationary) 328, a hand-held device, or other device, that may use a wireless link 330 to communicate with the idea service 102 system.

Figure 4:
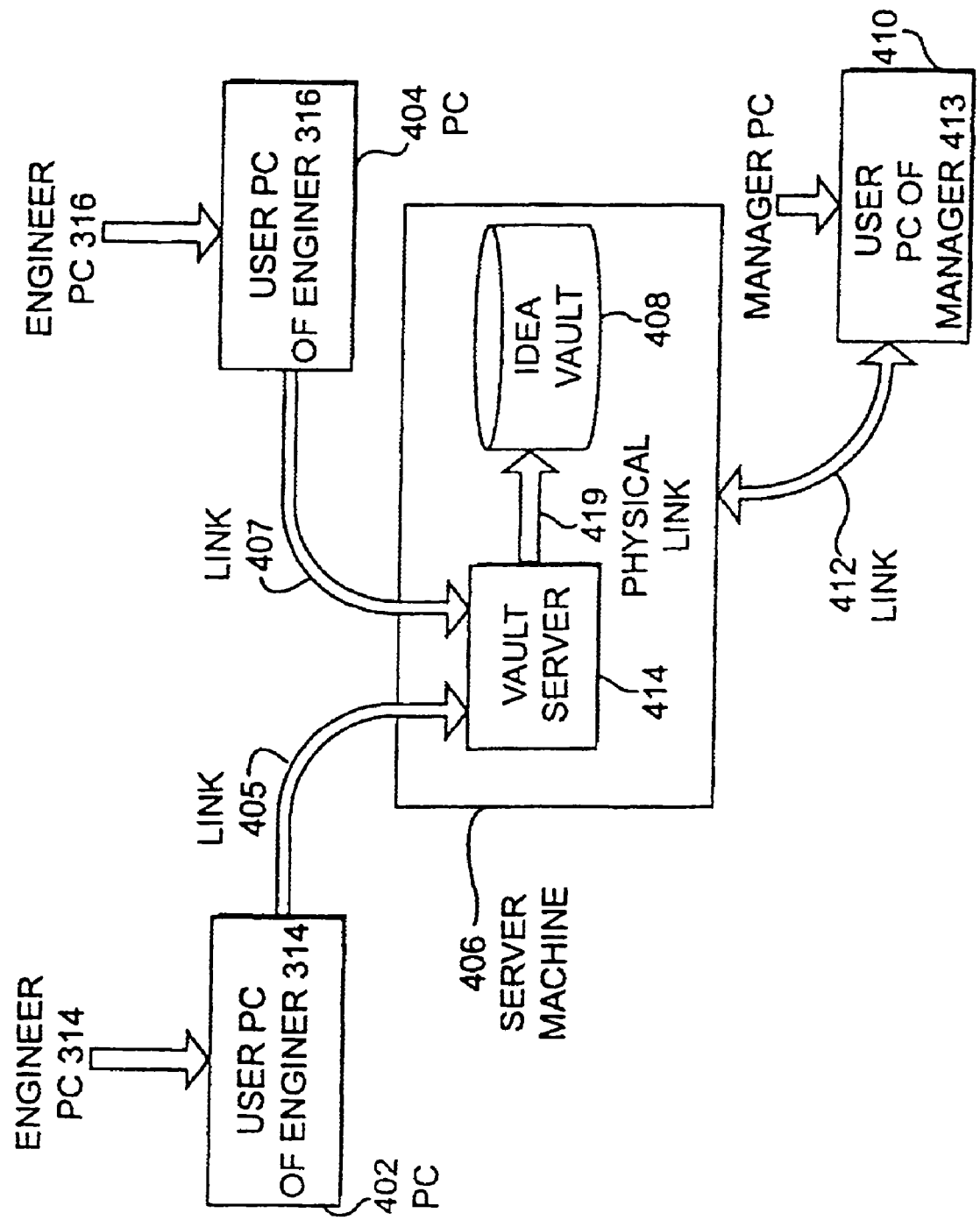
FIG. 4 is an illustration of another embodiment of the present invention.

FIG. 4 is an illustration of one embodiment of the present invention. Referring to FIG. 4, the user, which may be engineer 314, may be at work at personal computer (PC) 402. Engineer 314 enters an idea into the idea service 102 on PC 402. At the same time, an idea may be submitted by engineer 316 on PC 404 by use of the idea service 102. Once each engineer clicks the "send" button on each engineer's respective idea services 102, ideas submitted by engineer 314 and engineer 316 may be stored temporarily on each engineer's PC. During this time, the ideas wait to be submitted to a database (idea vault) 408. The idea vault 408 is queried by a database-access thread 242, previously discussed with regard to the description of FIG. 2b, until an idea vault 408 is available to accept ideas (files). Of course, multiple idea vaults 408 may be queried for availability to store files, and these idea vaults may also exist on a server machine 406. Once an idea vault (database) 408 is available, the ideas are submitted to vault server 414, located in server machine 406. The ideas are submitted to the vault server 414 via links 405 and 407, which may comprise physical links, wireless links, or other links. The vault server 414 then transfers the ideas to the idea vault 408 via a physical link 418.

Referring again to FIG. 4, the idea vault 408 may archive ideas permanently or temporarily. Ideas may be archived and purged on a periodic basis. Once the ideas are captured and stored by the idea vault 408, the ideas may be accessed and retrieved by a manager 413 who resides at PC 410. The ideas may be accessed and retrieved via a link 412, which may comprise a physical link, a wireless link, or any other type of link.

Figure 5:
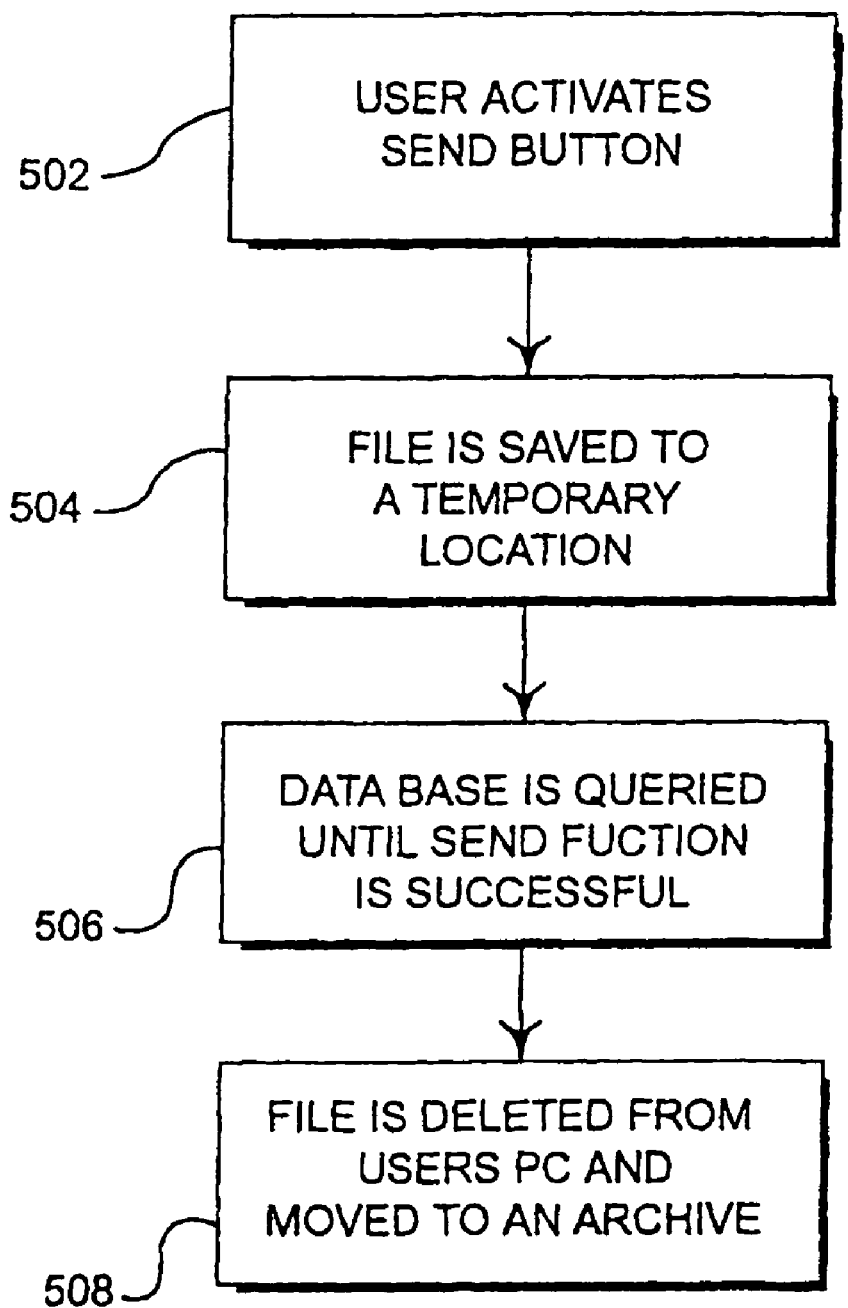
FIG. 5 is a flow diagram illustrating the steps performed in carrying out one implementation of the present invention.

FIG. 5 is a flow diagram illustrating the steps 500 performed in carrying out one implementation of the present invention. Referring to FIG. 5, a user elects to name/store the user's idea by selecting the "send" button in the idea service 102 at step 502. The process proceeds to step 504 where the idea (file) is stored temporarily to temporary location, such as local storage on the user's PC. The process then proceeds to step 506, where databases are queried until the file is successfully sent. The process then proceeds to step 508 where the idea (file) is deleted from the user's PC, or the idea (file) is moved to an archive at another location. As before, this other location may comprise a central computer.

Figure 6:
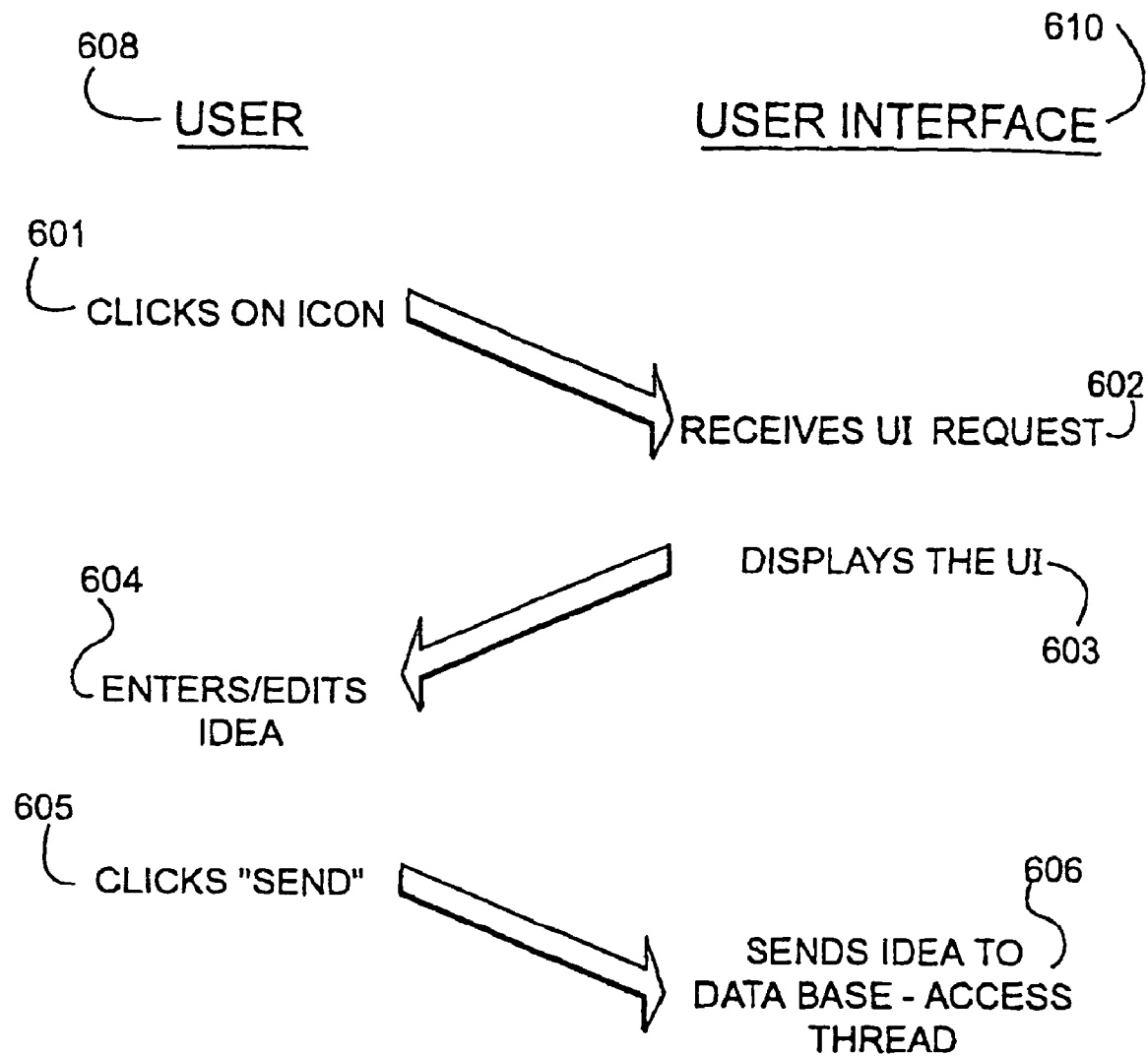
FIG. 6 is a sequence diagram illustrating the steps performed by the user and the idea service in carrying out the implementation of the present invention.

FIG. 6 is a sequence diagram illustrating the steps performed by the user 608 and the user interface 610 (idea service 102) in carrying out one implementation of the present invention. A user clicks on an icon in step 601. Such an icon may include a desktop icon or toolbar icon as also referred to in FIG. 2a. By clicking on the icon, the user has requested display of the user interface 610 (idea service 102). The process then proceeds to step 602, where the user interface 610 (idea service 102) receives the user interface request. At this time, the process proceeds to step 603, where the user interface 610 (idea service 102) displays the user interface, at which time the user enters and/or edits the user's idea in step 604. The process then proceeds to step 605, wherein the user chooses to submit the user's idea by clicking on a "send" button. Subsequent to the user's selection of "send", the process proceeds to step 606, where the user interface 610 (idea service 102) sends the idea (file) to a Java database-access thread, as previously discussed with regard to the description of FIG. 2b. The process continues as the database-access thread queries databases as to the databases' availability to store files. Such queries continue to be made until a successful store function is completed.

Figure 7:
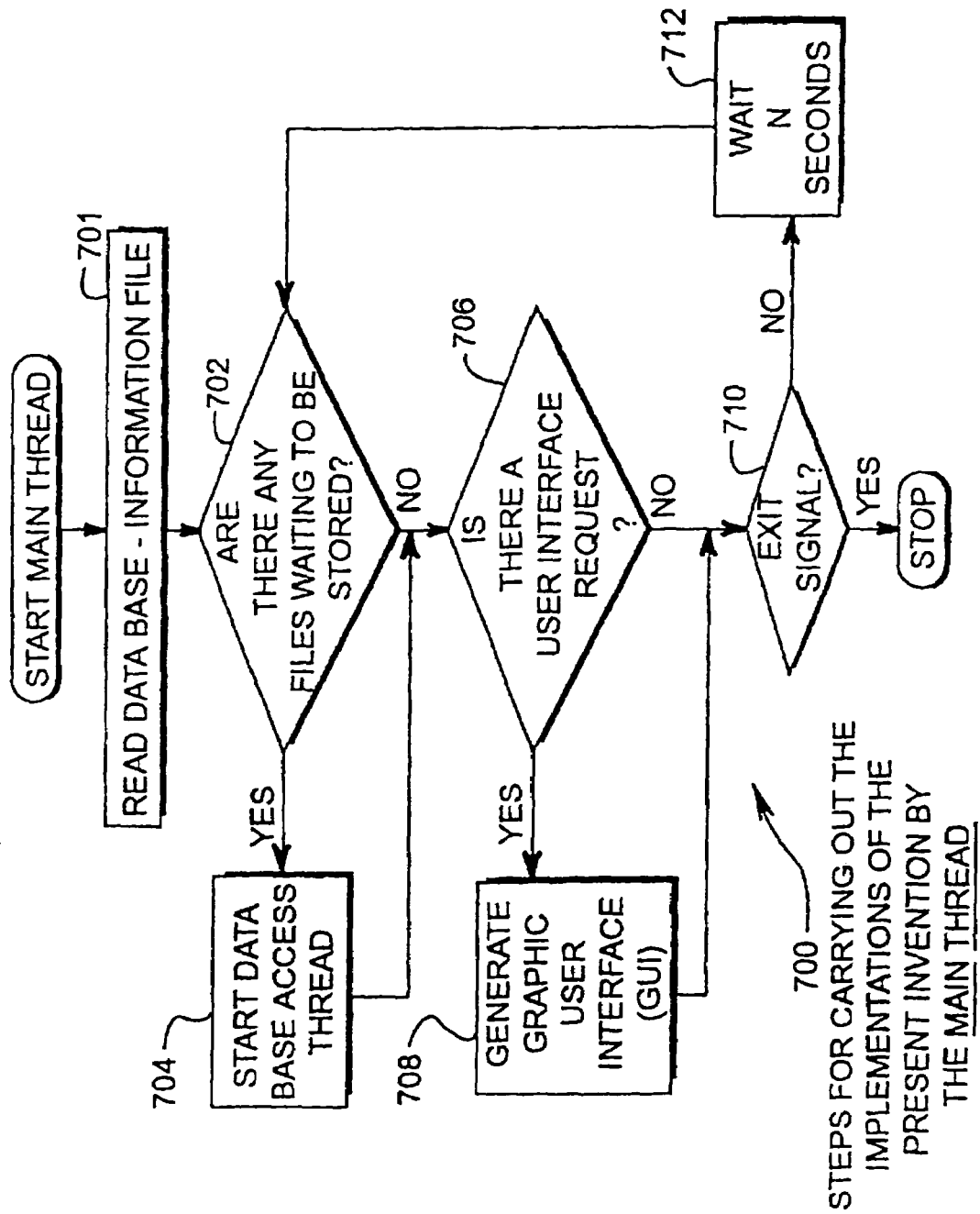
FIG. 7 is a flow diagram illustrating the steps performed by the main thread in carrying out an implementation of the present invention.

FIG. 7 is a flow diagram illustrating the steps 700 performed by the main thread in carrying out an implementation of the present invention. A thread is a single sequential flow of control within a program and is sometimes referred to as a "lightweight process." Threads are easy to use in Java.

Referring to FIG. 7, the process begins when the main thread is started up. Start up of the main thread may be achieved by the user clicking on an icon on the desktop. The process then proceeds to step 701 where the main thread reads a database-information file. The database-information file may contain such information as the number of databases that are readily available to be queried by the system that may comprise a network, a wireless remote location, or the user's personal computer or other locations. The database-information file may also contain information regarding database accessibility. The database-information file may also contain other detailed information on a database itself, such as the size of the database, the type of information the database may store, or the database location. Of course, the database-information file may comprise other information that may be useful to the user or to the operating system. The process proceeds to step 702 where the main thread is asked if there are any files waiting to be named/stored. Waiting files may be in a temporary directory, the user's personal computer, a network folder, or other location. Files may then be temporarily saved before the files are sent to a central storage vault. For example, the file may be located on the user's hard drive in C:\ideas.

Figure 8:
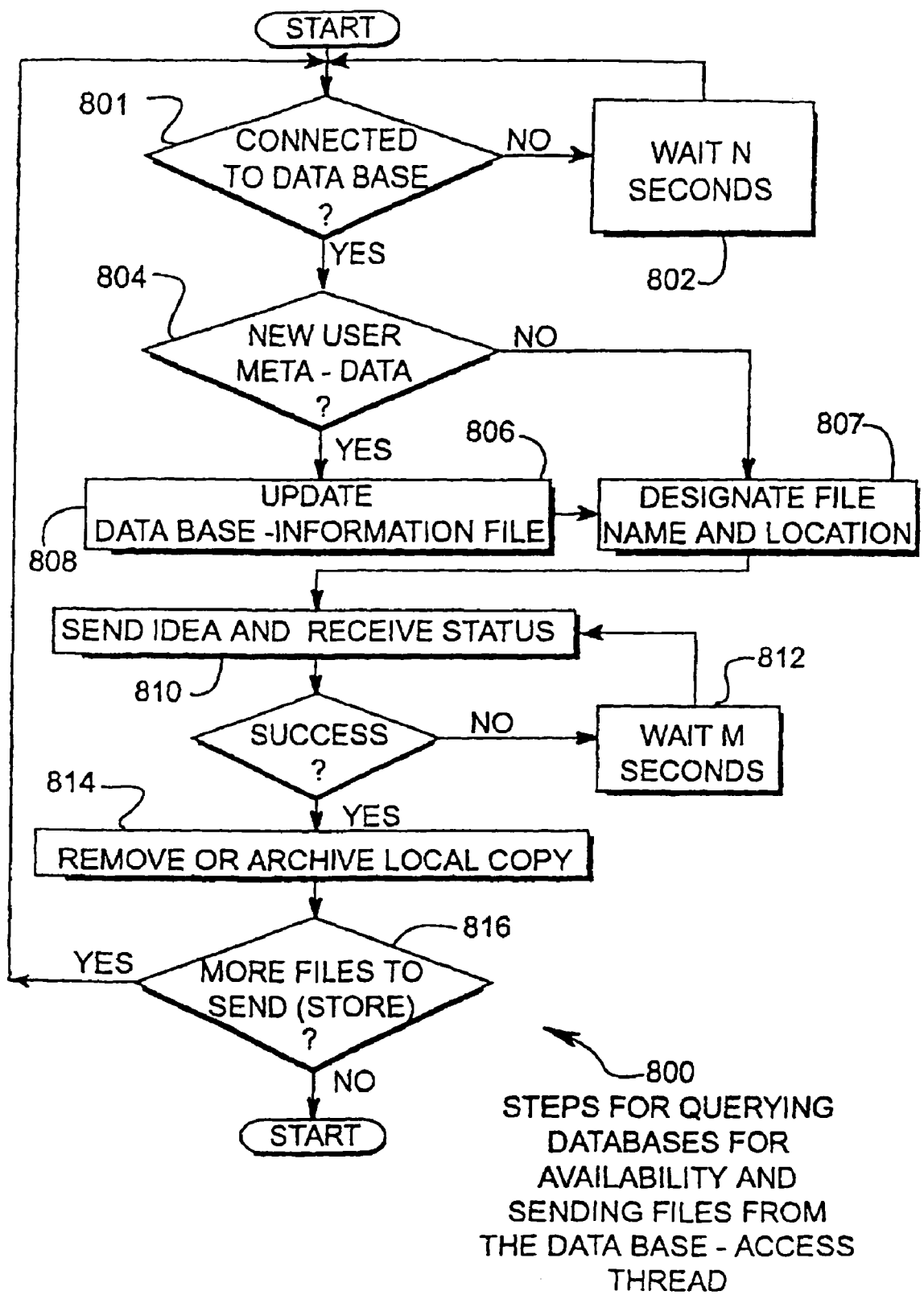
FIG. 8 is a flow diagram illustrating the steps performed by the database-access thread in carrying out an implementation of the present invention.

Referring again to FIG. 7, if a file is waiting to be stored, the process proceeds to step 704 where the database access thread is activated as can be further referenced with regard to the description of FIG. 8. Conversely, if there are no files waiting to be named/stored, the process proceeds to step 706 where a query is made as to whether or not the user has made a user interface (UI) request. If there has been a UI request, the process proceeds to step 708 where a graphical user interface (GUI) is displayed on the screen for inputting of new ideas by the user. The UI in Java can be compiled by a Java programmer and can comprise any sort of user interface text box, GUI or other such representational mechanisms in order to convey information between the user and the PC. Of course, the creation and/or design of the UI's and GUI's may be accomplished by traditionally used methods, or the UI's and GUI's may be designed in any format at the discretion of the UI/GUI maker. Such UI's or GUI's may comprise any combination of any text box, button, or other item. The UI is the mechanism by which users enter ideas.

Referring again to FIG. 7, the process proceeds to 710, where the system may make a query as to if the system has received a termination signal. If the system has received a termination signal, the process stops. If the system has not received a termination signal, then the process proceeds to step 712, where the main thread may be told to wait "N" milliseconds as predetermined by user input or instructions that have been embedded within the operating system, or until the main thread receives a user interface (UI) request.

FIG. 8 is a flow diagram illustrating the steps 800 performed by the database-access thread in carrying out an implementation of the present invention. The function of the database-access thread is to successfully store files entered by the user to a central storage location. The process begins at step 801 where a query is made as to whether or not there is a current connection to a database. Further reference is made to connection to a database with regard to the description of FIG. 9. If there is no connection to a database, the process proceeds to step 802 where the database-access thread waits "N" milliseconds before returning to step 801 to re-inquire as to whether or not there is a connection to a database. If there is a database connection, the process proceeds from step 801 to step 804, where a query is made as to whether or not metadata has changed. The information regarding the status of the user is contained within metadata. Such metadata may comprise the date of creation of file, personal user information, manager information, title of project, or other information. The metadata may be created automatically upon submission of idea, or the metadata may be manually input by the user or manager. The metadata is obtained before naming/storing the file, because should the user be a new user, the new user's information is obtained and the network administrator updates that users' personal information.

Referring again to FIG. 8, if the user metadata has changed, the process proceeds to step 806 where the database-information file is updated. As before, the database-information file may contain the location of the database, the type of information contained by the database, or other information. The process then proceeds to step 807 where the file is automatically given a name and location based on metadata. The metadata is stored in the file as a header and may include the user's department, project, and project manager. Each user has default information (default metadata) associated with each user. For certain ideas (files), this default information may be changed to more precisely reflect the idea (file). A program parses the metadata in the file header and selects a portion of the metadata to designate a file name and location. The process proceeds to step 807 where the file is automatically given a name and location and then sent to the database. Should the user metadata remain unchanged, the process proceeds directly to step 808 where the idea is sent to the database. The process then proceeds to step 810 where a status is received and possibly reported to the user. If the file has not been successfully stored, the process proceeds to step 812 where the database-access thread waits "M" milliseconds before attempting to store the file again. If the file has been successfully stored, the process proceeds to step 814 where a copy of the file may be archived. The file may be archived locally, on a network, or another location. The process proceeds to step 816 where a query is made as to whether or not more files are to be stored. If more files are to be stored, the process returns to step 801 where again, a query is made as to whether or not there is a connection to the database. If there are no more files to be stored, the process ends.

FIG. 9 is an example of pseudo-code 900 that can be used to implement the main thread. The main thread is instructed to "sleep" by programming the main thread such that the main thread appears to be performing another routine or some other function. The main thread searches for a database-information file. Instruction 902 indicates that if the main thread does not find the database-information file, the user may receive an instant error message and the main thread continues to search for the database-information file. Alternatively, if the database access thread searches for the database-information file, and the database-information file cannot be found, an error message may take longer to be generated and presented to the user. Thus, a benefit of the present invention is that, by having the main thread search for the database-access file, the user would know almost immediately whether or not the user's idea (file) has been sent successfully. If the computer is shut down, either intentionally, by accident, or by a power outage or other cause, before successful naming/storing of a file, upon powering up the computer again, the file would not be lost. Upon re-boot, the main thread would become activated and read the database-information file. If no problems occur with finding or reading the database-information file, and if any files are waiting, then those files that are waiting would be successfully named and stored. Upon clicking "send", the file is named and stored some time in the (possibly near) future. In most instances, the storage of the file occurs shortly after the user presses the "send" button.

Referring again to FIG. 9, the main thread reads the database-information file. The process proceeds to instruction 904 where a method called "run" is instigated. An infinite loop is instigated in instructions 904 and 906. Instruction 908 makes a query as to if any files are waiting. Instruction 910 states that if there are any files waiting, the database access thread is launched. Instruction 912 states that, if there are no files waiting, a new class called NewNote is created, and in instruction 912 the loop ends and a GUI appears to the user.

Instruction 916 returns the status of the file, stating whether or not the file has been successfully named/stored.

Figure 10:
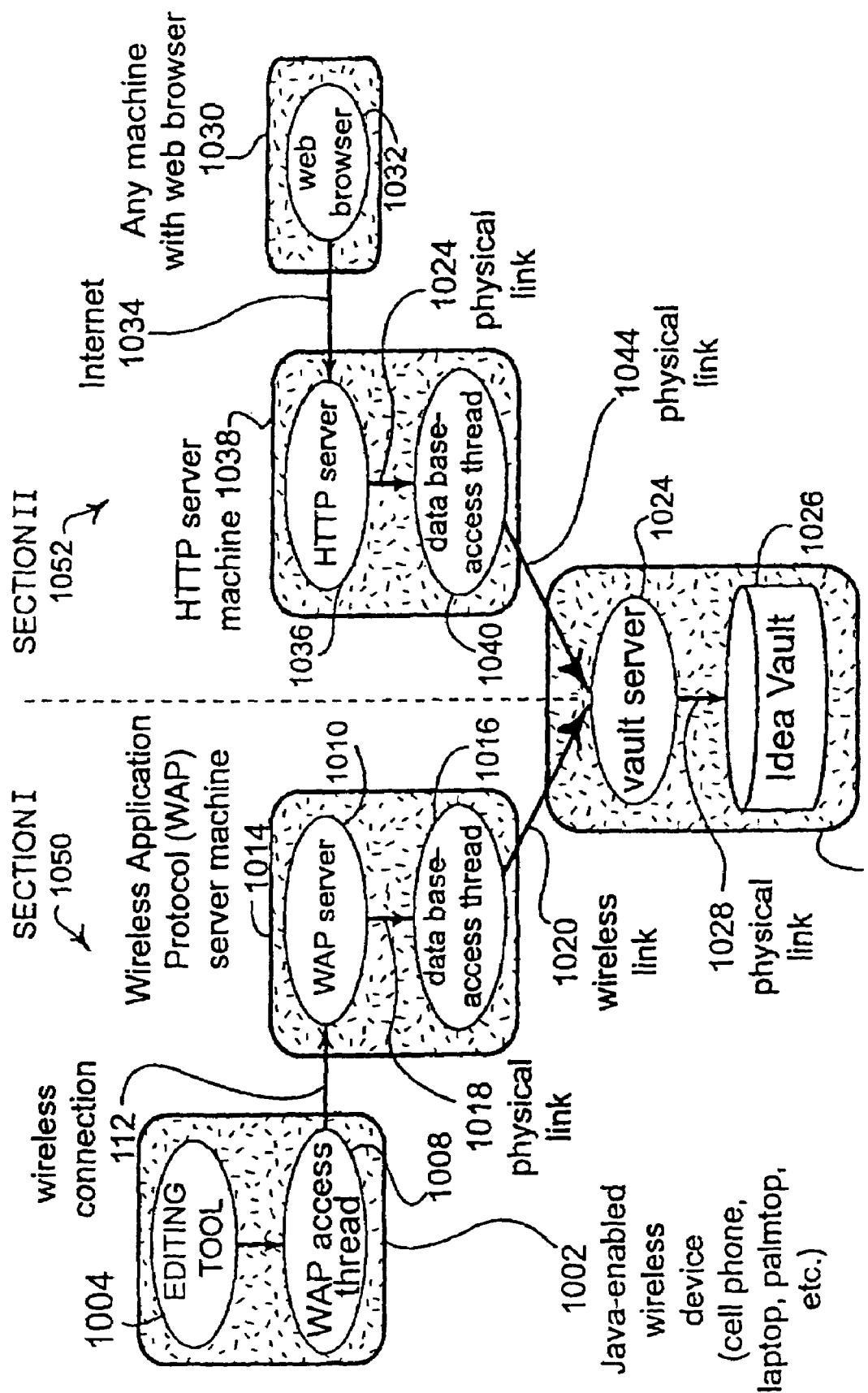
FIG. 10 is schematic block diagram that generally illustrates a wireless embodiment of the present invention.

FIG. 10 is schematic block diagram that generally illustrates a wireless embodiment of the present invention. Each box may exist as a separate entity (separate machine). FIG. 10 is compartmentalized into section I (1050) and section II (1052). As shown section I (1050) of FIG. 10, a Java-enabled wireless device 1002 may create an idea (file). Such a Java-enabled wireless device may comprise a cell phone, laptop, palm-pilot, personal electronic pocket organizer, or other Java-enabled wireless device wherein the software of the present invention exists on that device. The Java-enabled wireless device 1002 may contain an editing tool 1004. The editing tool may comprise a small user interface, which, as previously discussed, may comprise a graphical user interface, a text box, a window allowing user interaction, or other user interface.

Referring to FIG. 10, the editing tool 1004 may access a Wireless Application Protocol (WAP) access thread 1008. The link 1006 may send the idea (file), which has been input into the editing tool, from the editing tool 1004 to the WAP access thread 1008. The function of the WAP access thread 1008 is to establish a wireless connection to a WAP server and deposit the idea (file) that has been received by editing tool 1004 into the WAP server 1010. The WAP access thread 1008 may access WAP server 1010 via a wireless connection 1012. The WAP server 1010 may be located in a WAP server machine 1014. The wireless connection 1012 may comprise a RF link, a satellite link, an IR link, or any other wireless method of transmitting electronic data. The data transmitted by the wireless link may be encrypted. The WAP server machine 1014 may additionally comprise a database-access thread 1016. The database-access thread is a program that, after receiving the file from the WAP server, sends the file to an available database. The file may be sent from the WAP server 1010 via link 1018 to the database-access thread 1016.

Referring again to FIG. 10, the WAP server 1010 may be a server of Wireless Markup Language (WML.) The WAP server may receive information (files) from cell phones, etc. and may relay this information to the database-access thread 1016. The WAP server 1010 may act as a replacement for the editing tool. The WAP server machine 1014 may access a server machine 1022 that contains a vault server 1024 and an idea vault 1026 via a network connection 1020. The network connection 1020 may comprise any acceptable network connection. The database-access thread 1016 may be coupled to the WAP server 1010 and may receive the file from the WAP access thread. The database-access thread may query the vault server 1024 as to status of an available idea vault 1026. The vault server 1024, within the server machine 1022, may be linked to the database-access thread by a wireless connection, and may receive the file from the database-access thread once an idea vault 1026 becomes available to receive the file. The vault server 1024 may receive the idea via the wireless link 1020 from the database-access thread 1016. Of course, the vault server 1024 may receive multiple ideas (files) from the database-access thread 1016. The vault server 1024 may send the idea(s) or file(s) via a link 1028 to the idea vault 1026 for storage. The idea vault 1026 may contain multiple ideas (files).

Of course, the present invention may employ programming languages other than Java such as C, C++, or other programming languages. Java is a useful programming language in the implementation of the present invention because Java is not platform specific; that is, Java can be run on any operating system, including UNIX and Windows operating systems.

Referring again to FIG. 10, section II (1052), a machine 1030 with a web browser may create a file (idea). In section II (1052), the software of the invention is not on the machine 1030. The software may be accessed by the Internet and may exist on a Hypertext Transport Protocol (HTTP) server machine 1038 as will be subsequently explained. Such a machine 1030 may comprise a laptop, personal computer (PC), or other computational device. The machine 1030 with a web browser (PC) may contain a web browser 1032 which may comprise any web browser such as Netscape, Internet Explorer, or any other Internet browser. An Internet connection 1034 may be established between the PC 1030 and the user's Internet service provider, either by using a wireless link or a physical link. The PC 1030 may be connected to a HTTP server 1036 that is contained in a HTTP server machine 1038. The HTTP server 1036 is a web site and is more than a receiver of the file (idea). The HTTP server may return a description of a web page to the personal computer 1030. On the PC, that web page description is equivalent to the description of the user interface as previously discussed in FIG. 1. That is, a user interface may be displayed to the user, including a "send" button by which the user may submit the user's file (idea).

Referring again to FIG. 10 Section II (1052), the web browser 1032 may send the file (idea) to the HTTP server 1036 which in turn may send the idea (via a link 1042) to a database-access thread 1040, also running on the HTTP server machine 1038. The database-access thread 1040 may query a vault server 1024 as to status of an available idea vault 1026. The vault server 1024, within the server machine 1026, may be linked to the database-access thread 1040 by a network connection 1044, and may receive the file from the database-access thread 1040 once idea vault 1026 is available to receive the file. Again, network connection 1044 may comprise any network connection. A function of the HTTP server machine 1038 may be to provide the user interface to the Internet.

Referring again to FIG. 10 Section II (1052), as in section I (1050), the idea (file) may be sent to the vault server 1024. The HTTP server machine 1038 may access a server machine 1022 that contains a vault server 1024 and an idea vault 1026. The vault server 1024 may receive the idea from the database-access thread 1040. As before, the vault server 1024 may receive multiple ideas (files) from the database-access thread 1040. The vault server 1024 may send the idea(s) (file(s)) via a physical link 1028 to an idea vault 1026 for storage. The idea vault may contain multiple ideas (files).

The present invention therefore provides a system and method that allows for automatic methods of naming and storing electronic files. Files can be automatically named and stored through wireless methods as well as through methods involving physical links. Files can be submitted immediately by a user. After the user submits files, the successful naming and storing of those files is ensured by the present invention, thus freeing the user of any further obligation or task. The present invention frees the user of the obligation of selecting a file name and location, and allows the idea (file) to be submitted safely and immediately. In this way, the present invention allows for time-efficient naming and storing of files. The present invention may be carried out by any computer language. Java is an effective language for carrying out the present invention in that Java is platform independent. A further advantage of using Java is that threads may be a more efficient way of carrying out certain tasks, thus providing a more efficient way of automatically naming and storing files.

What is claimed is:

1. A method of automatically naming and storing a file that has been created by a user comprising:

creating said file within a user interface by creating and editing information within said user interface, wherein creating said file includes running a software application within a physical computer;

running a main thread within said software application that creates said user interface and makes said user interface visible to said user; and running said user interface using said main thread;

creating metadata to accompany said file;

inserting said metadata into said file;

using said metadata to automatically name said file;

using said metadata to automatically store said file in an automatically determined location, wherein storing said file includes running a database-access thread;

querying storage devices by said database-access thread until a storage device is available;

sending said file to said storage device once said connection to said storage device is established; and providing a message confirming status of an attempted file save function.

2. A method of automatically naming and storing a file that has been created by a user comprising:

creating said file within a user interface by creating and editing information within said user interface, wherein creating said file includes running virtual machine code upon boot-up that acts as a virtual computer within a physical computer;

running a main thread within said virtual machine code that creates said user interface and makes said user interface visible to said user; and running said user interface, within said main thread, that contains said file;

creating metadata to accompany said file;

inserting said metadata into said file;

using said metadata to automatically name said file;

using said metadata to automatically store said file in an automatically determined location; wherein storing said file includes spawning a database-access thread from said main thread;

querying storage devices by said database-access thread until a storage device is available;

sending said file from Java database-access thread to said storage device once said connection to said storage device is established; and sending a message from said storage device to said database-access thread confirming status of an attempted file save function.

3. The method of claim 2 wherein the step of sending said message comprises sending confirmation of a successful send function.

4. The method of claim 2 wherein the step of sending said message comprises sending continuation of a successful save function.

5. The method of claim 2 wherein the step of sending said message comprises sending an error message to user indicating a failed send function.

6. The method of claim 2 wherein the stop of sanding said message comprises sending an error message to user indicating a failed save function.

7. The method of claim 2 wherein the step of automatically sending and saving a file that has been created by a user is completed by using Java computer code.

8. The method of claim 2 wherein the step of storing said file that has been created by a user is completed by using C++ computer code.

9. The method of claim 2 wherein the step of storing said file that has been created by a user is completed by using C computer code.

10. The method of claim 2 wherein the step of storing said file that has been created by a user is completed by using computer code.

11. The method of claim 2 wherein the step of storing said file that has been created by a user is completed on a Windows® operating system.

12. The method of claim 2 wherein the step of storing said file that has been created by a user is completed by starting a main service at boot-up.

13. The method of claim 2 wherein the step of storing said file that has been created by a user is completed on a UNIX operating system.

14. The method of claim 2 wherein the step of storing said file that has been created by a user is completed by starting a main daemon at boot-up.

15. The method of claim 2 wherein the step of storing said file that has been created by a user is completed on an operating system.

16. The method of claim 2 wherein the step of and storing said file that bus been created by a user comprises transmitting said file from an external location to a central location via a wireless link.

17. The method of claim 2 wherein the step of storing file that has been created by a user comprises transmitting said file from an external location to a central location via a physical link.

18. The method of claim 2 wherein said step of sending said tile from said database-access thread to said storage device comprises reading a database-information file that contains availability status of storage devices, making a query as to status of waiting files, starring said database-access thread, making a query as to status of a request for user interface functions, generation of user interface, making a query as to status of an exit signal, giving an instruction to wait.

19. The method of claim 18 further comprising:
querying said storage device by said database-access tread until a storage device is available;
giving an instruction to wait; querying status of said metadata; updating said database-information file;
generating success status of said file;
making a query as to success status of said file;
archiving said file; and,
making a query as to status of waiting files.

20. The method of claim 19 wherein the step of sending said tile from said database-access thread to said storage device comprises deleting said file after a period of time.

21. The method of claim 1 wherein the step of inserting said metadata into said file comprises inserting said metadata manually.

22. The method of claim 1 wherein the step of inserting said metadata into said file comprises inserting said metadata manually by a system administrator.

23. The method of claim 1 wherein the step of inserting said metadata into said file comprises inserting said metadata manually by said user.

24. The method of claim 1 wherein the step of inserting said metadata into said file comprises inserting said metadata automatically.

25. The method of claim 2 wherein the step of sending said message comprises sending an email message to said user.

26. The method of claim 2 wherein the step of sending said message comprises printing a status sheet for the user.

27. The method of claim 2 wherein the step of storing said file comprises making said file accessible to a supervisor.

28. The method of claim 1 wherein said step of creating said file within a user interface comprises pasting information from programs external to said user interface into said user interface.

29. A system of automatically naming and storing a file that has been created by a user comprising:
a user interface in which said file is created and edited;
a program that parses metadata, located in the header of said file, and that automatically designates a filename and location to said file;
a virtual machine that is started upon boot-up, and acts as a virtual computer within a physical computer;
a main thread, that runs within said virtual machine, and that creates said user interface and makes said user interface visible to said user;
a database-access thread that is spawned from said main thread;
a storage device, coupled to said database-access thread that is queried by said database-access thread as to status of availability for storage of said file and that receives said file from said database-access thread, stores said file once said storage device becomes available, and sends a message back to said database-access thread confirming status of attempted file save function.

30. The system of claim 29 wherein said storage device comprises a database.

31. The system of claim 29 wherein said storage device comprises a central computer.

32. The system of claim 29 wherein said file comprises information that has been pasted from programs external to said user interface into said user interface.

33. The system of claim 29 wherein said file comprises textual information.

34. The system of claim 29 wherein said file comprises graphical information.

35. The system of claim 29 wherein said physical computer comprises a computational device.

36. The system of claim 29 wherein said physical computer comprises an electronic pocket organizer.

37. The system of claim 29 wherein said physical computer comprises a laptop.

38. The system of claim 29 wherein said physical computer comprises a device capable of transmitting electronic information.

39. The system of claim 29 wherein said user interface comprises a graphical user interface.

* * * * *